(12) United States Patent
Erickson

(10) Patent No.: US 10,550,544 B1
(45) Date of Patent: *Feb. 4, 2020

(54) SPRING LOADED FEEDING DEVICE

(71) Applicant: Edwin A. Erickson, Milnor, ND (US)

(72) Inventor: Edwin A. Erickson, Milnor, ND (US)

(*) Notice: Subject to any disclaimer, the term of this patent is extended or adjusted under 35 U.S.C. 154(b) by 0 days.

This patent is subject to a terminal disclaimer.

(21) Appl. No.: 16/577,324

(22) Filed: Sep. 20, 2019

Related U.S. Application Data

(63) Continuation-in-part of application No. 16/386,433, filed on Apr. 17, 2019.

(51) Int. Cl.
*E02F 5/02* (2006.01)
*A01B 13/16* (2006.01)
*E02F 3/18* (2006.01)
*A01B 49/02* (2006.01)

(52) U.S. Cl.
CPC .............. *E02F 5/025* (2013.01); *A01B 13/16* (2013.01); *A01B 49/027* (2013.01); *E02F 3/186* (2013.01); *E02F 5/027* (2013.01)

(58) Field of Classification Search
CPC ......... A01B 13/00; A01B 13/02; A01B 13/16; A01B 49/027; E02F 3/188; E02F 3/20; E02F 3/205; E02F 3/241; E02F 3/186; E02F 3/185; E02F 5/027; E02F 5/08; E02F 5/025; E02F 5/14; E02F 5/32
USPC ..... 37/91, 94, 189, 191, 244, 248, 366, 372; 172/109, 149, 799.5
See application file for complete search history.

(56) References Cited

U.S. PATENT DOCUMENTS

| | | |
|---|---|---|
| 16,007 A | 11/1856 | Evans |
| 163,061 A | 5/1875 | Fenley |
| 444,986 A | 1/1891 | Bloominger |
| 709,601 A | 9/1902 | Horner |
| 1,095,097 A | 4/1914 | Fournet |
| 1,175,926 A | 3/1916 | Bunnell |
| 1,320,285 A | 10/1919 | Smith |
| 1,627,017 A | 5/1927 | Dempewolf |
| 2,027,502 A | 1/1936 | Weismuller |
| 2,362,728 A | 11/1944 | Smith |
| 2,453,723 A | 11/1948 | Palmer |
| 2,455,148 A | 11/1948 | Traver |
| 2,609,621 A | 9/1952 | Babin |

(Continued)

FOREIGN PATENT DOCUMENTS

| | | |
|---|---|---|
| CA | 536983 | 2/1957 |
| CA | 640318 | 4/1962 |

(Continued)

*Primary Examiner* — Robert E Pezzuto
(74) *Attorney, Agent, or Firm* — Neustel Law Offices

(57) ABSTRACT

A spring-loaded feeding device for a ditch digging apparatus. The spring-loaded feeding device includes a shaft rotatably mountable on a frame and rotatable in a direction of rotation, and one or more feeder paddle assemblies. each feeder paddle assembly comprises a bracket on the shaft extending radially outward, the bracket comprising a pivot axis proximate the shaft and a spring-connection point spaced apart from the pivot axis. The feeder paddle assembly also has a feeder paddle with a first end near the shaft and a second end spaced apart from the first end, the feeder paddle extending radially outward from the shaft from the first end to the second end, the feeder paddle being pivotally coupled to the bracket at the pivot axis and also coupled to the bracket by a spring positioned between the feeder paddle and the spring-connection point of the bracket.

19 Claims, 12 Drawing Sheets

(56) References Cited

U.S. PATENT DOCUMENTS

| | | |
|---|---|---|
| 2,662,311 A | 12/1953 | Chattin |
| 2,784,507 A | 3/1957 | Kinsinger |
| 2,788,726 A | 4/1957 | Keyes |
| 2,837,989 A | 6/1958 | Gann |
| 2,885,800 A | 5/1959 | Hawkins |
| 2,923,073 A | 2/1960 | Baker |
| 2,940,188 A | 6/1960 | Penote |
| 2,965,985 A | 12/1960 | Sillasen |
| 2,987,837 A | 6/1961 | Rasmussen |
| 2,990,632 A | 7/1961 | Noblin |
| 3,021,622 A | 2/1962 | Whittier |
| 3,025,618 A | 3/1962 | Croucher |
| 3,041,751 A | 7/1962 | Chattin |
| 3,306,368 A | 2/1967 | Rosenvold |
| 3,315,381 A | 4/1967 | Fisher |
| 3,343,286 A | 9/1967 | Ray, Jr. |
| 3,483,929 A | 12/1969 | MacIntyre |
| 3,601,910 A | 8/1971 | Goltz |
| 3,624,826 A | 11/1971 | Rogers |
| 3,695,716 A | 10/1972 | Meyer |
| 3,720,299 A | 3/1973 | Wegmann |
| 3,805,421 A | 4/1974 | Kamlukin |
| 3,880,243 A | 4/1975 | Gurries |
| 4,161,072 A | 7/1979 | Pronovost |
| 4,227,579 A | 10/1980 | Isbell |
| 4,483,084 A | 11/1984 | Caldwell |
| 4,548,277 A | 10/1985 | Dietrich, Sr. |
| 4,776,290 A | 10/1988 | Rau |
| 4,833,797 A | 5/1989 | Slunecka |
| 4,976,052 A | 12/1990 | Jeane |
| 5,027,534 A | 7/1991 | Sackett |
| 5,063,999 A | 11/1991 | Packham |
| 5,113,610 A | 5/1992 | Liebrecht, Jr. |
| 5,237,761 A | 8/1993 | Nadeau |
| 5,255,454 A | 10/1993 | Pounds |
| 5,437,113 A | 8/1995 | Jones |
| 6,226,903 B1 | 5/2001 | Erickson |
| 6,269,560 B1 | 8/2001 | Pratt |
| 6,341,435 B1 | 1/2002 | Erickson |
| 6,418,647 B1 | 7/2002 | Erickson |
| 6,564,479 B1 | 5/2003 | Vickers |
| 7,121,021 B2 | 10/2006 | Sakai |
| 7,171,770 B2 | 2/2007 | Schultz |
| 7,690,138 B2 | 4/2010 | Hall |
| 2015/0250098 A1 | 9/2015 | Vandeven |
| 2017/0022685 A1 | 1/2017 | Thompson |

FOREIGN PATENT DOCUMENTS

| | | |
|---|---|---|
| CA | 651579 | 11/1962 |
| DE | 811295 | 8/1951 |
| FR | 1014975 | 8/1952 |

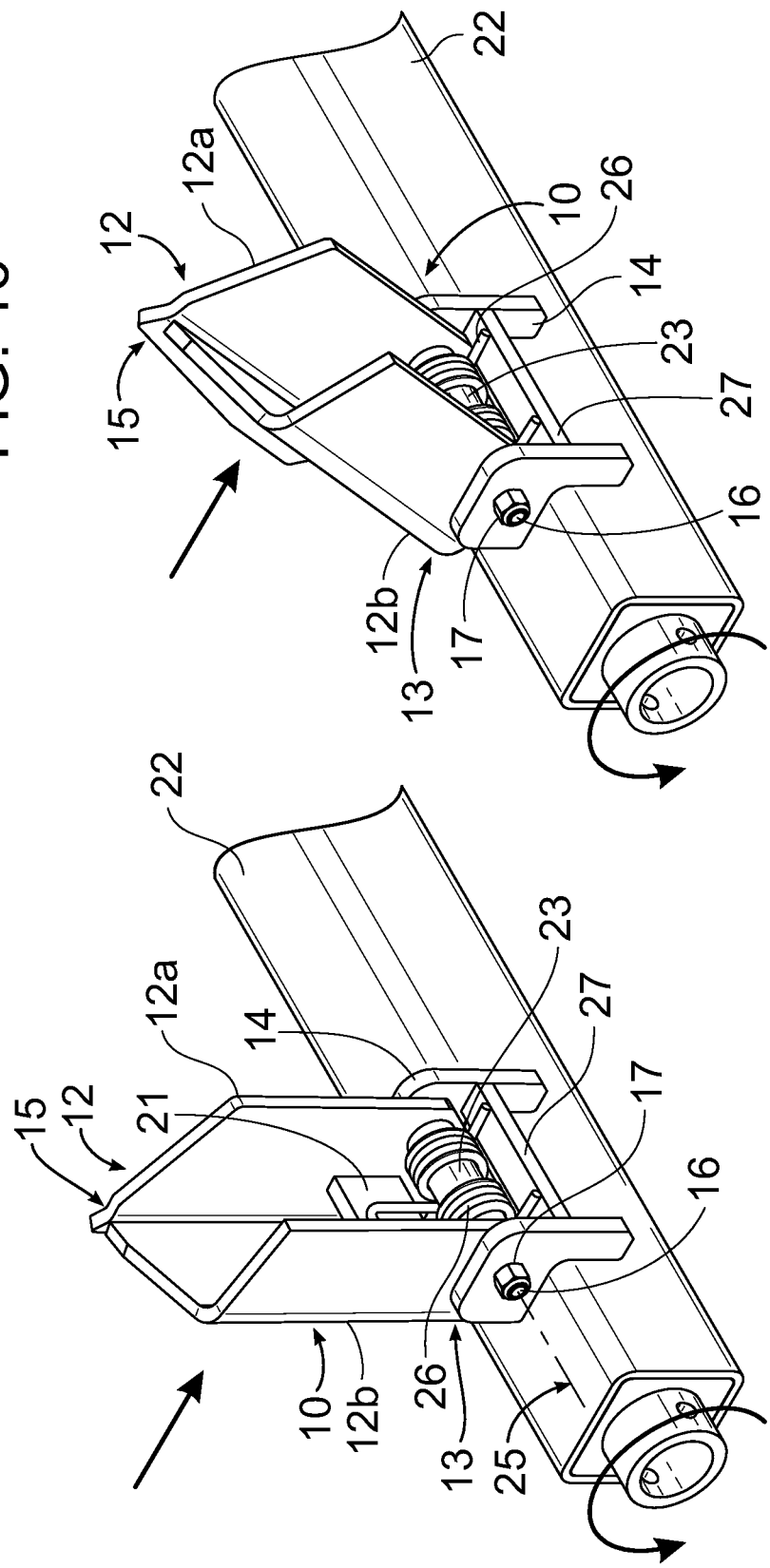

SPRING LOADED FEEDING DEVICE

CROSS REFERENCE TO RELATED APPLICATIONS

I hereby claim benefit under Title 35, United States Code, Section 120 of U.S. patent application Ser. No. 16/386,433 filed Apr. 17, 2019. This application is a continuation-in-part of the Ser. No. 16/386,433 application. The Ser. No. 16/386,433 application is currently pending. The Ser. No. 16/386,433 application is hereby incorporated by reference into this application.

STATEMENT REGARDING FEDERALLY SPONSORED RESEARCH OR DEVELOPMENT

Not applicable to this application.

BACKGROUND

Field

Example embodiments in general relate to a spring-loaded feeding device for a ditch digging apparatus.

Related Art

Any discussion of the related art throughout the specification should in no way be considered as an admission that such related art is widely known or forms part of common general knowledge in the field.

Ditch digging devices have been in use for years. Typically, a vertically orientated rotary blade member is utilized that has a rotational plane parallel to a vertical axis. The lower edge of a rotary blade engages, cuts and throws the dirt, creating a curved ditch structure.

Conventional ditch diggers that are towed behind tractors require significant PTO power to the PTO shaft since the rotary blade is initially engaging, cutting and throwing the dirt. In addition, conventional ditch diggers merely create a curved ditch that easily fills in with dirt and debris over time, requiring constant cleaning. Also, a curved ditch is incapable of handling a volume of water as great as a flat-bottomed ditch of the same width. In addition, the velocity of water flowing through a conventional curved ditch is significantly higher than a flat-bottomed ditch of the same width, thereby increasing erosion of the land.

Certain flat-bottom ditching machines that use a front blade to cut flat-trenches solve most of the problems associated with conventional ditch diggers. However, one of the problems associated with such machines is that the soil becomes elevated above the front blade, but does not always drop down onto the rotating discharge fan, thereby causing plugging problems and soil dispersing problems.

SUMMARY

An example embodiment is directed to a spring-loaded feeding device. The spring-loaded feeding device may generally include a shaft rotatably mountable on a frame and rotatable in a direction of rotation, and a feeder paddle assembly, the feeder paddle assembly comprising:

a) a bracket mounted on the shaft extending radially outward from the shaft, the bracket comprising a pivot axis proximate the shaft and a spring-connection point spaced apart from the pivot axis; and b) a feeder paddle comprising a first end proximal to the shaft and a second end spaced apart from the first end, the feeder paddle extending radially outward from the shaft from the first end to the second end, the feeder paddle being pivotally coupled to the bracket at the pivot axis and also coupled to the bracket by a spring positioned between the feeder paddle and the spring-connection point of the bracket.

The feeder paddle is pivotable in a direction opposite the direction of rotation upon compression of the spring. In some example embodiments of the soil feeding device, the feeder paddle assembly comprises a plurality of feeder paddle assemblies. The device may also include at least two feeder paddle assemblies that are spaced apart from each other along the shaft. Further, the plurality of feeder paddle assemblies may comprise a second plurality of feeder paddle assemblies that each have the same radial orientation on the shaft.

In still other example embodiments of the soil feeding device, the plurality of feeder paddle assemblies comprise a third plurality of feeder paddle assemblies that each have the same radial orientation on the shaft. The second plurality of feeder paddle assemblies may have a different radial orientation on the shaft than the third plurality of feeder paddle assemblies. For example, the second plurality of feeder paddle assemblies may have a radial orientation on the shaft that is rotated about 90° from the third plurality of feeder paddle assemblies.

In another example embodiment of the soil feeding device, the feeder paddle assembly comprises a first feeder paddle assembly, further comprising a second feeder paddle assembly mounted on the shaft at an orientation radially spaced about 180° from the first feeder paddle assembly. For example, the first feeder paddle assembly may be mounted radially opposite the second feeder paddle assembly at a same location along a length of the shaft, so that both the first feeder paddle assembly and the second feeder paddle assembly engage and feed incoming soil once with each revolution of the shaft.

The soil feeding device may further comprise a third feeder paddle assembly mounted on the shaft at a radial orientation radially spaced about 90° from the first feeder paddle assembly. The third feeder paddle assembly may be spaced apart from the first feeder paddle assembly along the shaft. The device may further comprise a fourth feeder paddle assembly mounted on the shaft at an orientation radially spaced about 180° from the third feeder paddle assembly. The fourth feeder paddle assembly may be mounted radially opposite the third feeder paddle assembly at a same location along a length of the shaft as the third feeder paddle assembly.

Each feeder paddle assembly may also comprise a spring plate that couples the feeder paddle to the bracket. The feeder paddle may be coupled to the bracket with a bolt between the spring plate and the bracket. For example, the bolt may be positioned inside the spring, which may be a compression spring that urges the feeder paddle away from the bracket.

In another example embodiment, each feeder paddle assembly may comprise a feeder paddle pivotally mounted on the bracket, the feeder paddle comprising a first end proximal to the shaft and a second end spaced apart from the first end, the feeder paddle extending radially outward from the shaft from the first end to the second end. In this embodiment, each feeder paddle assembly may also comprise a torsion spring positioned to apply a force between the feeder paddle and the bracket, with the force applied such that the paddle is forced away from the bracket, and the paddle is pivotable in a direction opposite the direction of the shaft rotation, about the pivot axis.

There has thus been outlined, rather broadly, some of the embodiments of the spring-loaded feeding device in order that the detailed description thereof may be better understood, and in order that the present contribution to the art may be better appreciated. There are additional embodiments of the spring-loaded feeding device that will be described hereinafter and that will form the subject matter of the claims appended hereto. In this respect, before explaining at least one embodiment of the spring-loaded feeding device in detail, it is to be understood that the spring-loaded feeding device is not limited in its application to the details of construction or to the arrangements of the components set forth in the following description or illustrated in the drawings. The spring-loaded feeding device is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

FIG. 15 is another perspective view of a feeder paddle assembly and a shaft of a spring-loaded feeding device in accordance with an example embodiment.

FIG. 16 is an exploded view of a feeder paddle assembly and a shaft of a spring-loaded feeding device in accordance with an example embodiment.

A. OVERVIEW

Figure 1:
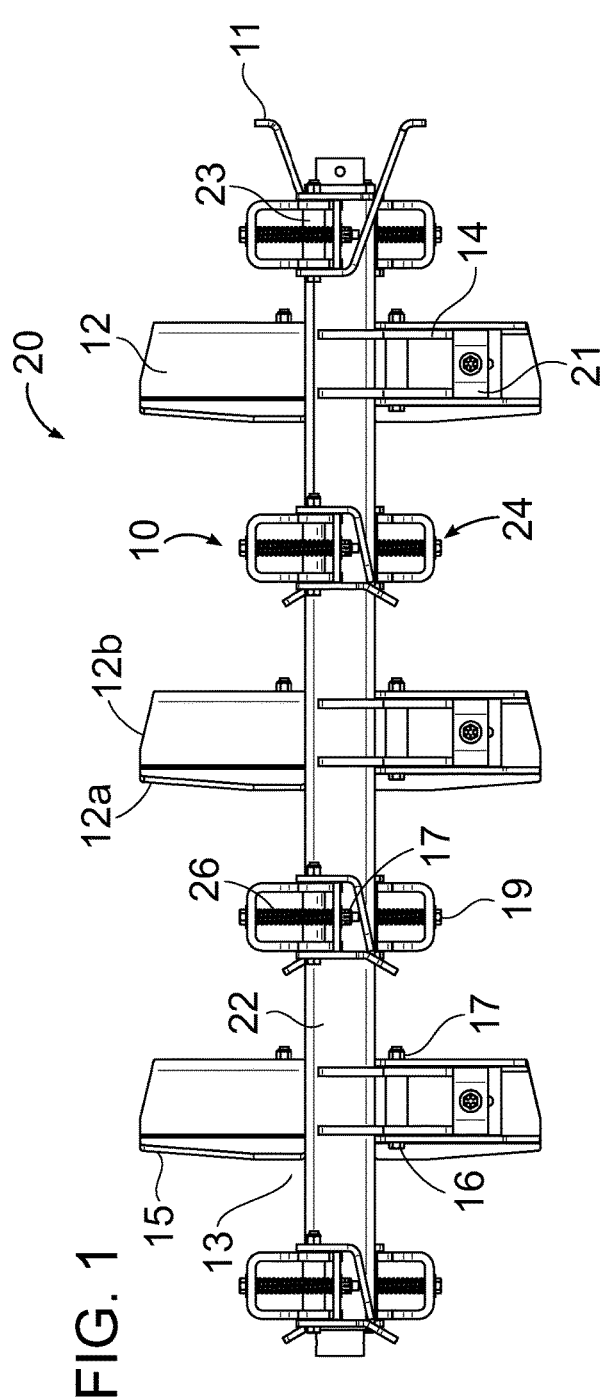
FIG. 1 is a top view of a spring-loaded feeding device in accordance with an example embodiment.

An example spring-loaded feeding device 20 generally comprises a shaft 22 rotatably mountable on the frame of a flat-bottomed ditcher 30 and rotatable in a direction of rotation, and one or more feeder paddle assemblies 10. The feeding device 20 is positioned just behind and above the blade 32 of the ditcher 30, and is used to break up the soil cut and loosened by the blade 32, and to feed the soil to a dispersing fan behind the blade and the feeding device 20.

Each feeder paddle assembly 10 generally comprises:

a) a bracket 14 mounted on the shaft 22 extending radially outward from the shaft, the bracket 14 comprising a pivot axis 25 defined by a pivot bolt 16 proximate the shaft 22, and a spring-connection point 24 defined in some embodiments by a coupling bolt 19, the spring-connection point 24 spaced apart from the pivot axis 25; and b) a feeder paddle 12 comprising a first end 13 proximal to the shaft 22 and a second end 15 spaced apart from the first end, the feeder paddle 12 extending radially outward from the shaft 22 from the first end 13 to the second end 15, the feeder paddle 12 being pivotally coupled to the bracket 14 at the pivot axis and also coupled to the bracket by a spring 26 positioned between the feeder paddle 12 and the spring-connection point 24 of the bracket 14.

The feeder paddles 12 are mounted on the brackets 14 with pivot bolts 16 that pass through holes in the feeder paddles 12 and the brackets 14 near the shaft 22, with locknuts 17 threaded onto the end of the bolts to secure the bolts. Each feeder paddle 12 is pivotable in a direction opposite the direction of rotation upon compression of the spring 26. The direction of rotation is counterclockwise viewed from the left of the ditcher when the ditcher is facing left, so that the each feeder paddle moves toward the back of the ditcher at the bottom of its position as it rotates. The pivoting action of the feeder paddles prevents or reduces the likelihood that the feeder device will jam in the event that a rock or other obstruction becomes lodged between a feeder paddle 12 and the blade 32 of the ditcher. As mentioned, in some example embodiments of the soil feeding device 20, the feeding device 20 comprises a plurality of feeder paddle assemblies 10. The device 20 may also include at least two feeder paddle assemblies 10 that are spaced apart from each other along the shaft 22. Further, the plurality of feeder paddle assemblies 10 may comprise a second group of feeder paddle assemblies 10 that each have the same radial orientation on the shaft 22, although other arrangements are possible.

In still other example embodiments of the soil feeding device 20, the plurality of feeder paddle assemblies 10 comprise a third plurality or group of feeder paddle assemblies that each have the same radial orientation on the shaft. The second group of feeder paddle assemblies 10 may have a different radial orientation on the shaft 22 than the third plurality of feeder paddle assemblies. For example, the second group of feeder paddle assemblies may have a radial orientation on the shaft 22 that is rotated about 90° from the third group of feeder paddle assemblies. This configuration is especially easy to implement if shaft 22 is square, as the square cutouts of the brackets 14 can simply be arranged 90° apart. Thus, the soil feeding device 20 may comprise feeder paddle assemblies arranged in groups of two, each group of two being mounted on opposite "sides" of the shaft (that is, radially mounted 180° apart), with additional groups of two being mounted along the shaft, and mounted about 90° radially from the adjacent group. For each feeder paddle assembly 10 that is mounted radially opposite another feeder paddle assembly at a same location along a length of the shaft 22, both feeder paddle assemblies 10 will engage and feed incoming soil to the dispersing fan 38 once with each revolution of the shaft 22. Any number of feeder paddle assemblies 10 may be mounted this way along the shaft 22. Other radial spacings are possible as well.

Each feeder paddle assembly may also comprise a spring plate 21 that couples the feeder paddle 12 to the bracket 14. The feeder paddle assembly 10 may be coupled to the bracket with a coupling bolt 19 between the spring plate and the bracket. For example, the bolt 19 may be positioned inside the spring 26, which may be a compression spring that urges the feeder paddle 12 away from the bracket. Each feeder paddle may be comprised of multiple pieces. For example, the feeder paddles may comprise two main metal pieces 12a and 12b, with the spring plate 21 welded between them for rigidity and also for coupling the feeder paddles 12 to the brackets 14.

For ease of mounting, the rotating shaft 22 may be a square metal tube, so that the brackets 14 may be easily aligned on the shaft 22 and welded in place. Further, it is not critical or necessary that each feeder paddle 12 be identical to the other paddles that make up the feeding device 20. For example, the feeding device may include outer feeder paddles 11 that may be outer feeder paddles, which are elongated in the axial direction (as compared to feeder paddles 12) so that the paddles can prevent soil from entering and clogging the device from the end.

Figure 14:
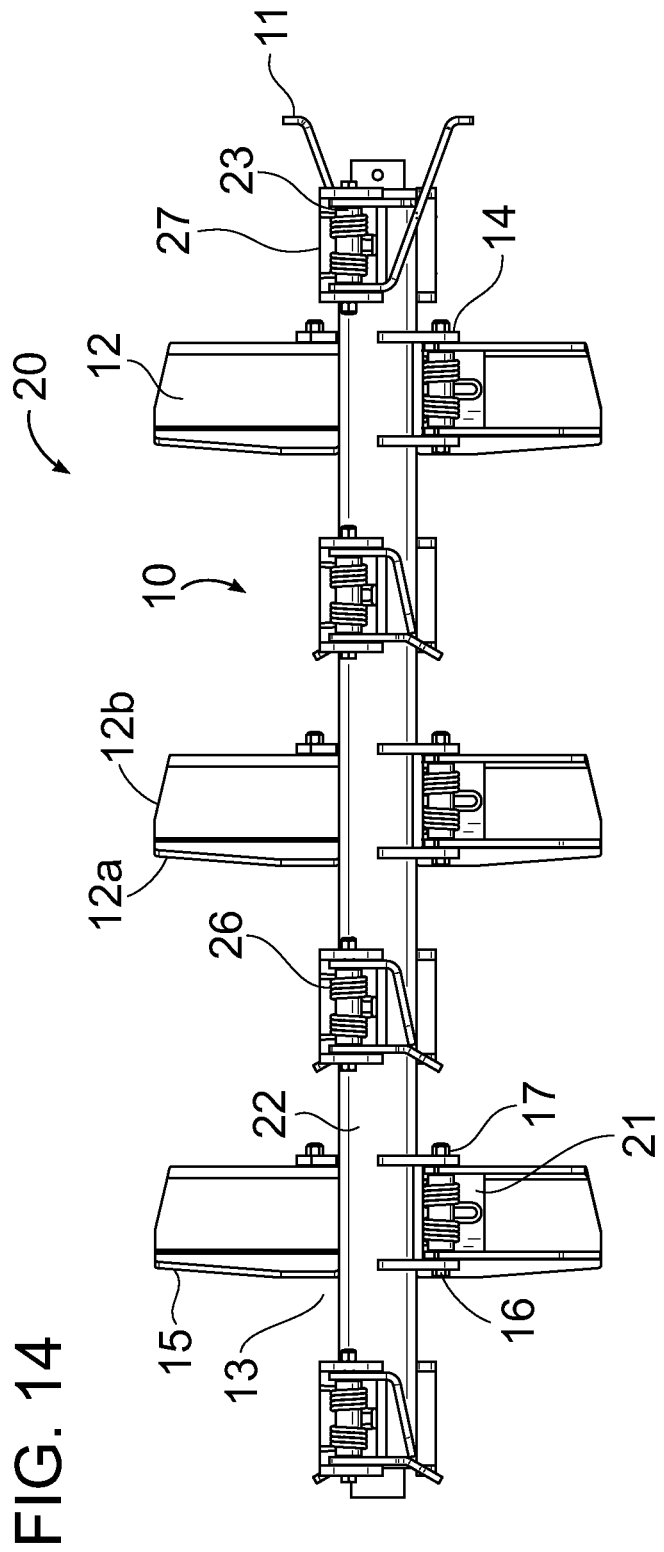
FIG. 14 is a top view of a spring-loaded feeding device in accordance with another example embodiment.

In an alternative embodiment, the feeder paddle 12 (i.e., each feeder paddle in the device) can be biased away from the bracket 14 with a torsion spring 26, as shown in FIGS. 14-16. In operation, this embodiment functions as the previously-discussed embodiments that use a compression spring 26. However, the torsion spring 26 may be positioned over the pivot bolt 16, which may pass through bracket 14. The pivot bolt 16 may also pass through sleeve 23 which holds the substantially parallel sides of the feeder paddle 12 and bracket 14 apart when the nut 17 is tightened on pivot bolt 16. The sleeve 23 also provides a hub for torsion spring 26, holding the spring in position.

Figure 13:
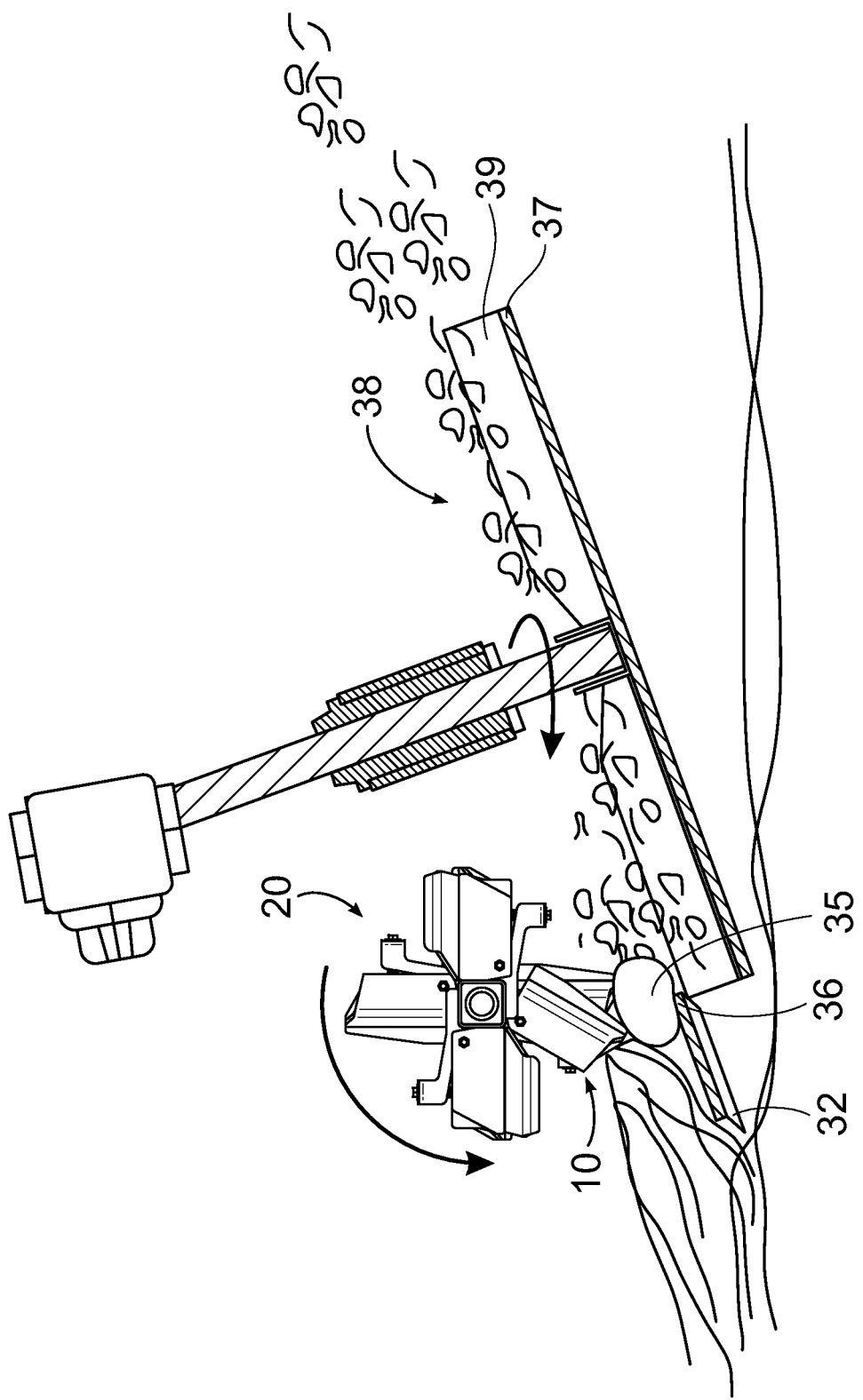
FIG. 13 is another partial side view of a spring-loaded feeding device in use in accordance with an example embodiment.

As best shown in FIGS. 15 and 16, the torsion spring 26 is positioned over bolt 16 and sleeve 23, with ends that are prevented from rotating by spring stop 27 of bracket 14, relative to the bracket. Further, the spring 26 is engaged by spring plate 21 of each feeder paddle, such that the spring 26 exerts a restoring force to the feeder paddles, which tends to return each paddle to its normal position after it has pivoted upon encountering an obstruction. Accordingly, as viewed in FIGS. 15 and 16, the torsion spring 26 applies a force in the counterclockwise direction, which is the same direction that the shaft 22 rotates (as indicated by the rotational arrows). Upon encountering an obstruction, as shown in FIG. 13, the feeder paddle 12 may rotate about pivot axis 25 until the obstruction is cleared, at which time spring 26 will apply force to restore feeder paddle 12 to its "normal" position, as shown in FIG. 15. The direction of force caused by an obstruction is indicated by the straight arrows in FIGS. 15 and 16.

As mentioned above briefly, the ditcher with which the soil feeding device is usable comprises a frame 34 having a hitch and a pair of support arms with wheels, and a blade 32, a dispersing fan 38 rotatably mounted on the frame 34 behind the blade 32 and the feeding device 20, and an adjustable deflector assembly attached to the rear portion of the frame 34. The dispersing fan 38 generally comprises a circular base 37 and a number of fan blades 39 attached to the upper surface of the circular base. Generally, the dispersing fan is less than 45° with respect to the ground surface. The soil feeding device 20, as mentioned above, has a shaft 22, which may have a square profile when viewed in cross section. The shaft is rotationally mounted on the frame 34, and is typically driven by a drive system mechanically connected to the shaft. For example, the drive system may include a hydraulic motor 40 that drive a chain 42 that, in turn, drives the shaft 22 of the spring-loaded feeding device 20.

In operation, the blade 32 of the ditcher severs soil from the ground surface at a desired depth. The forward edge of blade 32 is generally parallel, or nearly so, to the ground surface, so that the ditcher 30 creates a desirable flat-bottomed ditch. As the ditcher is towed behind a tractor, the blade's action lifts the soil, and the feeding device 20 engages the soil, breaking it apart and propelling it onto the dispersing fan 38, so that fan blades 39 throw the dirt away from the resulting ditch.

B. FEEDER PADDLE ASSEMBLY

Figure 4:
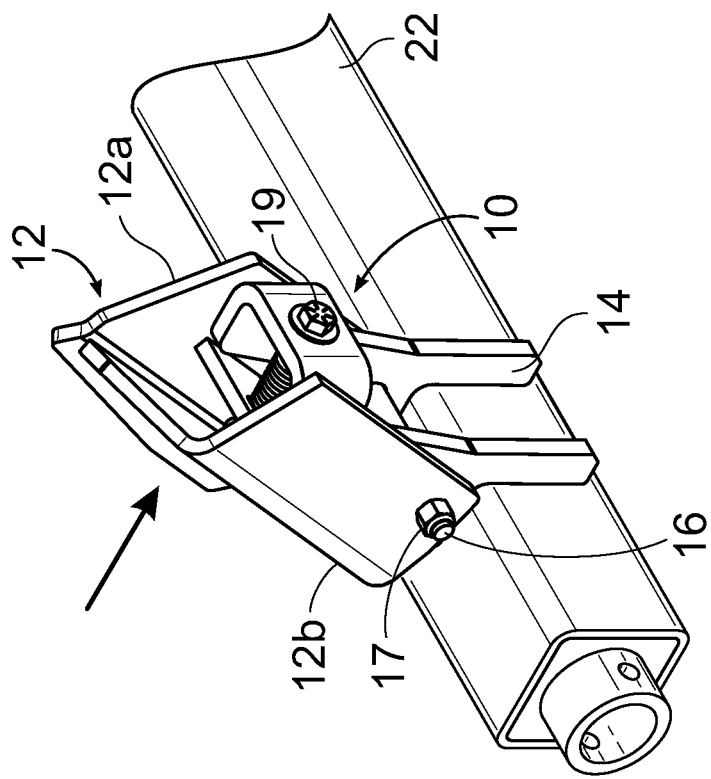
FIG. 4 is a perspective view of a feeder paddle assembly and a shaft of a spring-loaded feeding device in accordance with an example embodiment.
Figure 5:
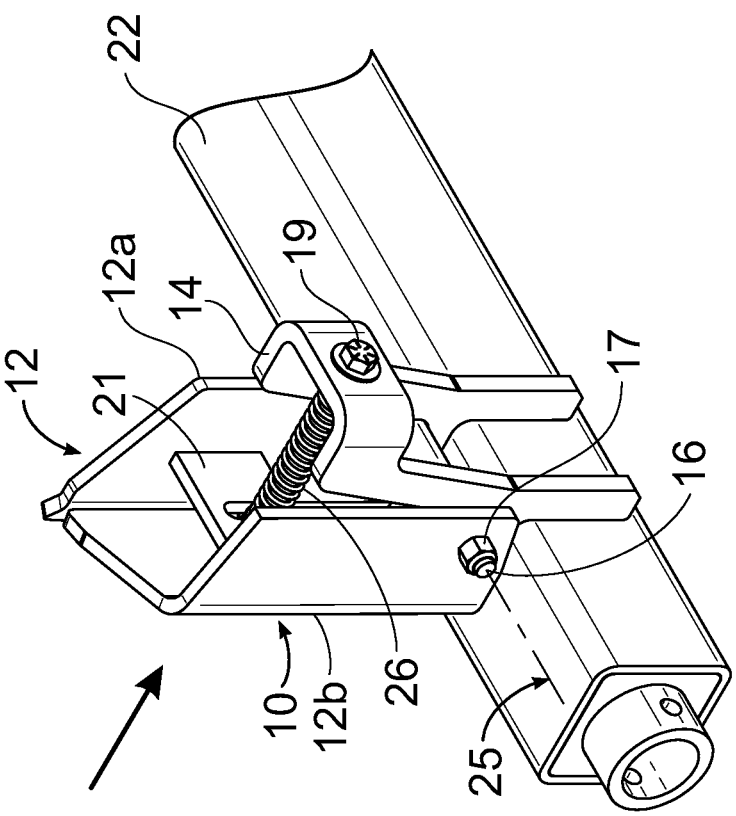
FIG. 5 is another perspective view of a feeder paddle assembly and a shaft of a spring-loaded feeding device in accordance with an example embodiment.
Figure 6:
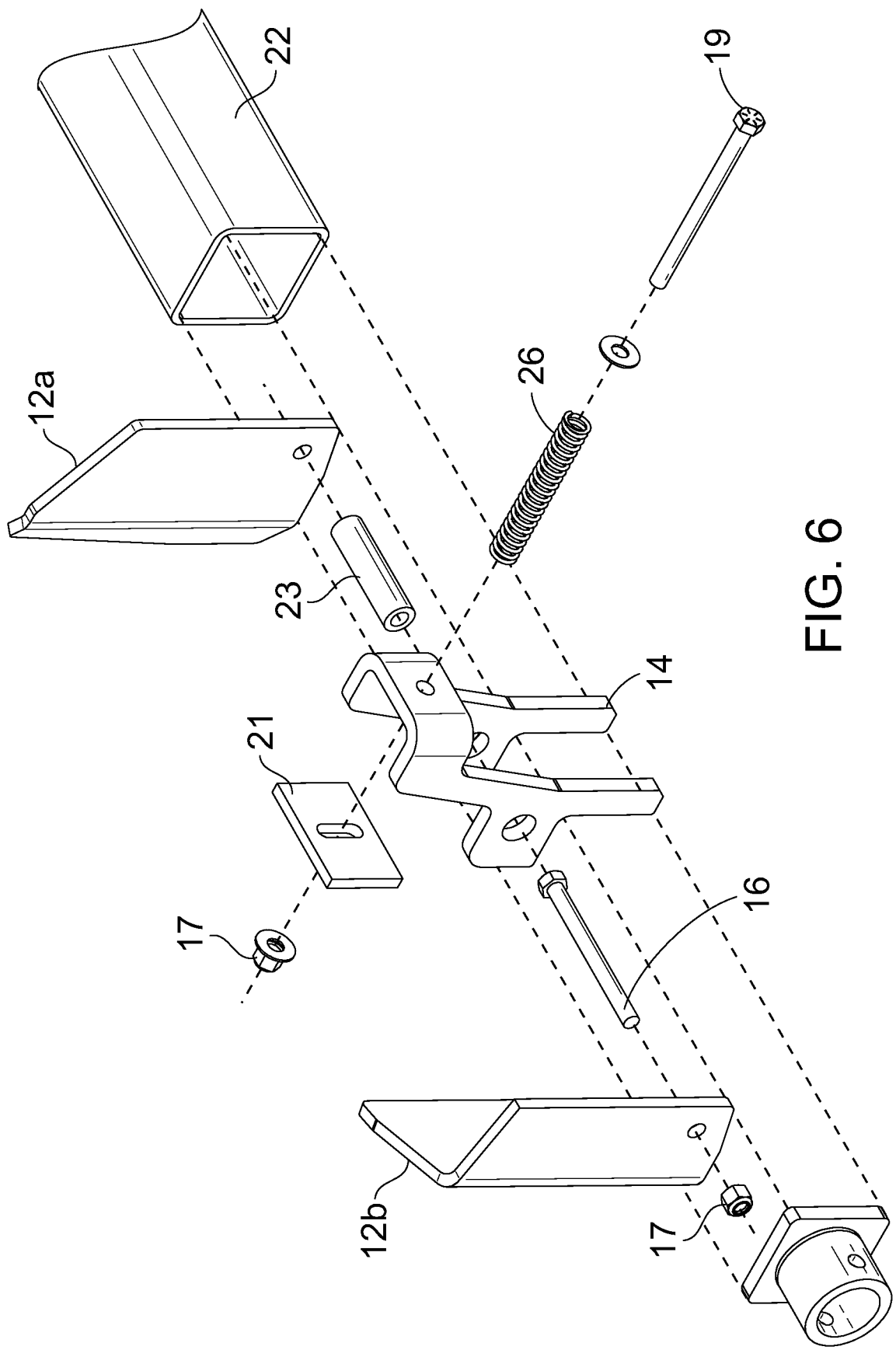
FIG. 6 is an exploded view of a feeder paddle assembly and a shaft of a spring-loaded feeding device in accordance with an example embodiment.
Figure 9:
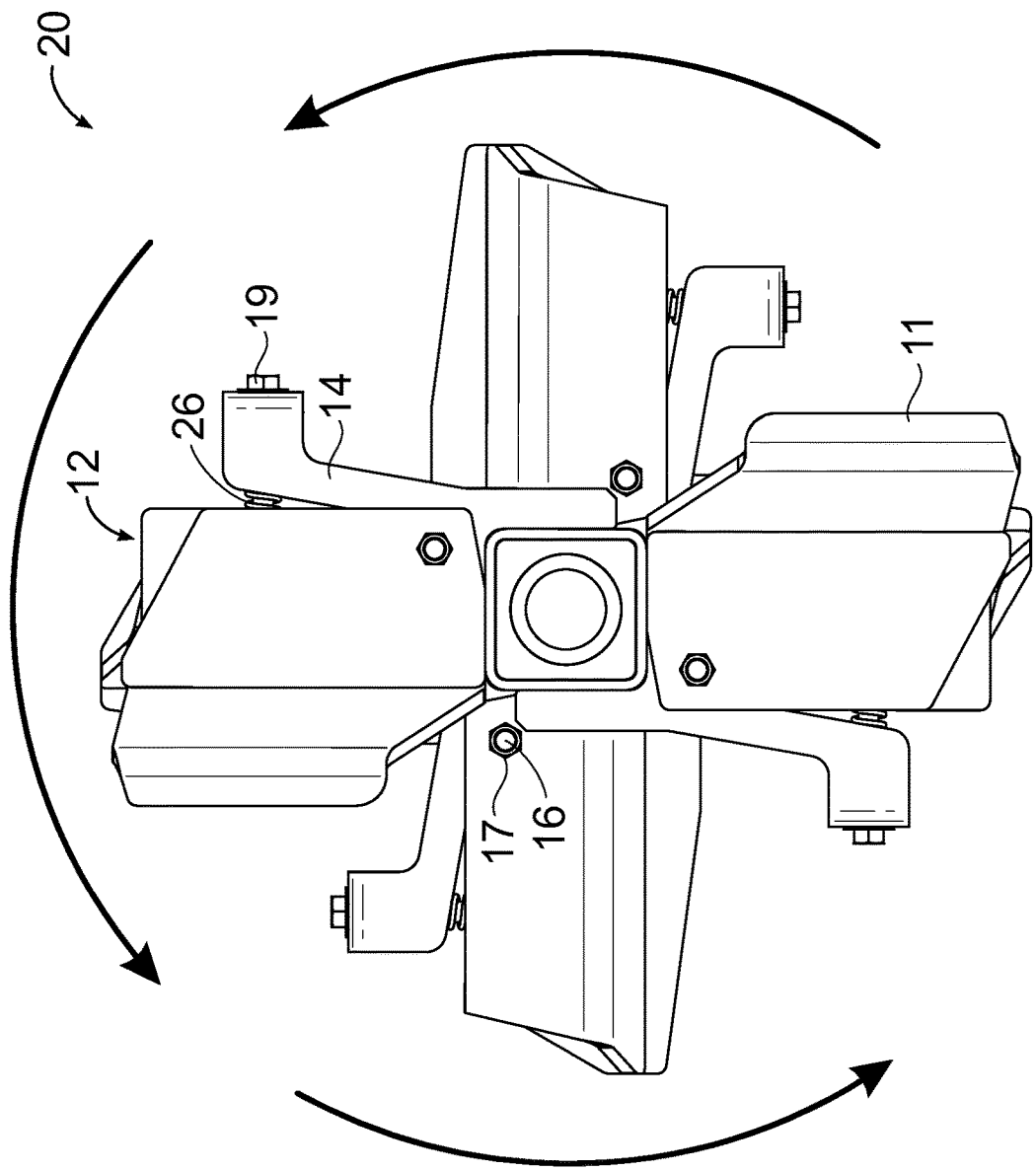
FIG. 9 is a side view of a spring-loaded feeding device in accordance with an example embodiment.

As best shown in FIGS. 1-5 and 14-16, the spring-loaded feeding device 20 comprises one or more feeder paddle assemblies 10 that are mounted on a rotating shaft 22. The entire assemblies 10 rotate along with the shaft 22, in the direction shown in FIGS. 9 and 12, for example. As best shown in FIG. 6, each feeder paddle assembly 10 is typically comprised of several pieces: a feeder paddle side plate 12a, an inner feeder angle plate 12b, and a spring plate 21 that make up a feeder paddle. The spring plate 21 may be welded in place between plate 12a and 12b, thus making the feeder paddle 12 a substantially rigid assembly. Each feeder paddle 12 is further held in position by pivot bolt 16 and locknut 17. Pivot bolt 16 passes through both plates 12a and 12b, as well as bracket 14. This forms each feeder paddle assembly 10. Multiple such assemblies or groups of assemblies can be mounted on shaft 22 to create the entire spring-loaded feeding device 20. Any feeder paddle assembly may be radially spaced apart from any other, and multiple assemblies can be installed along the length of shaft 22.

As mentioned above, each feeder paddle assembly 10 may also be of an alternative type, which uses a torsion spring 26 rather than a compression spring. This embodiment is shown in FIGS. 14-16, and once assembled, the entire mechanism works as with the compression spring embodiment to allow the feeder paddles 12 to pivot about a pivot axis so that rocks, etc., will not jam the feeder mechanism. In both embodiments, the brackets 14 and feeder paddles 12 may comprise at least two sides that are substantially parallel, as shown in the figures. This allows the sides of each bracket to guide and contain the feeder paddles, so that the feeder paddles are kept in alignment and generally pivot about pivot axis 25, which is generally parallel with the axis of shaft 22.

Figure 2:
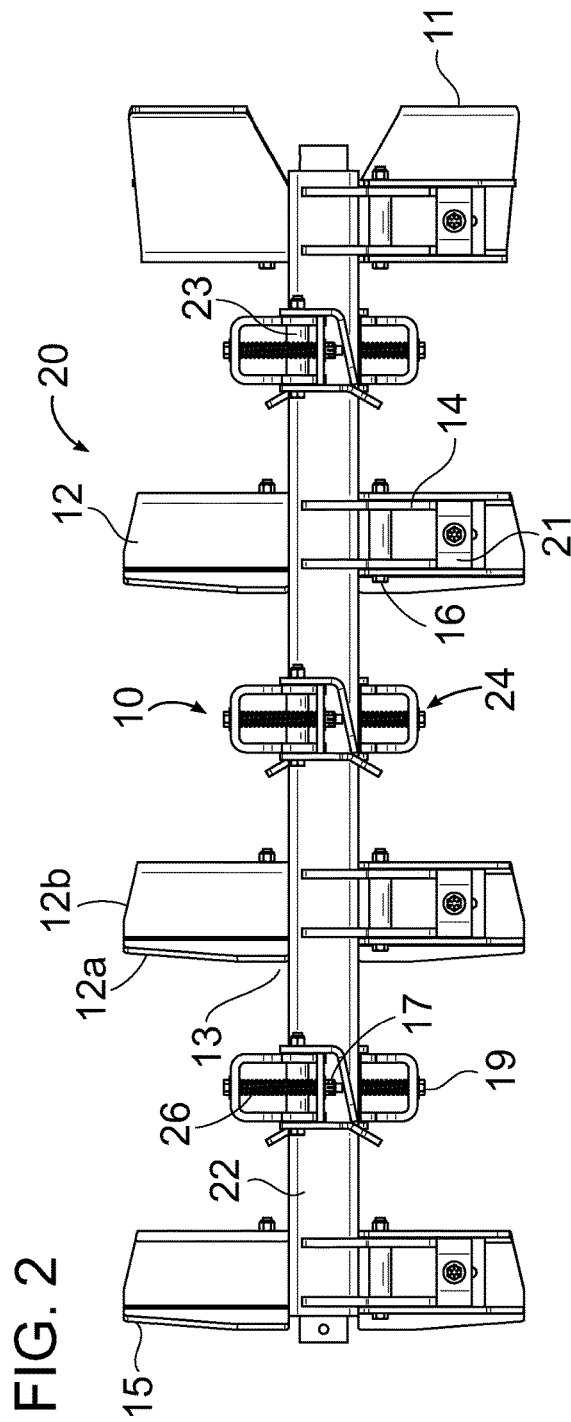
FIG. 2 is a side view of a spring-loaded feeding device in accordance with an example embodiment.

As shown in FIGS. 1 and 2, each side plate 12a may comprise a leading edge that will be the first part of paddle 12 to strike and engage soil that is lifted by the blade 32 as the ditcher is towed or moves over the soil. Such a single edge may present more concentrated force to the soil that is lifted by the blade 32, in order to more easily break it apart and throw it onto the dispersing fan 38. As shown in FIGS. 1 and 2, the flat portion of feeder angle plates, 12b, will then engage a larger surface portion of the soil to propel it into the dispersing fan 38, as the entire spring-loaded feeding device rotates at high speed just above and behind the dispersing fan 38.

Figure 3:
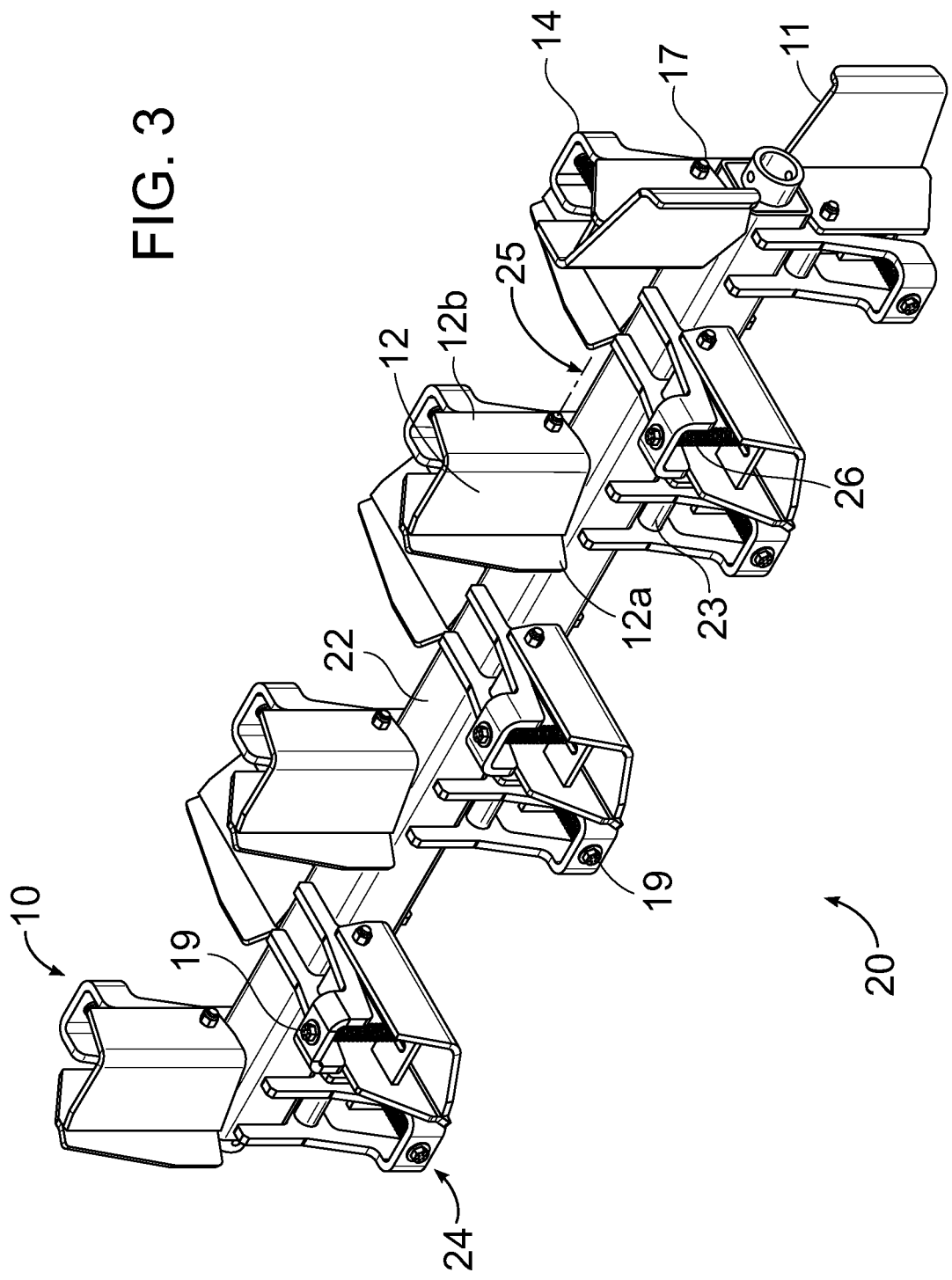
FIG. 3 is a perspective view of a spring-loaded feeding device in accordance with an example embodiment.

Each feeder paddle 12 is movably mounted to a bracket 14. The brackets 14 are securely mounted, for example, by welding, to shaft 22. To facilitate mounting and alignment, the shaft 22 may be a square-profile metal tube, so that the right-angle partial opening of the brackets can be positioned on, and welded to, the shaft 22, as shown in FIG. 3. Other arrangements are also possible. For example, the shaft 22 can be round, corresponding to round holes or partial cutouts on the brackets 14 that may be mounted on the shaft 22. The feeder paddles 12 are typically coupled to the brackets 14 in two places, and the brackets with feeder paddles comprise feeder paddle assemblies 10. The feeder paddles 12 are pivotally connected to the brackets 14 near the shaft 22 at a pivot axis 25, which is defined and created by pivot bolt 16 which, together with locknut 17, attaches each feeder paddle 12 to each bracket 14.

Each feeder paddle 12 may also be coupled to the bracket 14 at a second point or position, toward the second end 15 of the feeder paddle. The connection point may be spaced apart from the pivot axis. As shown, for example, in FIGS. 1-4, a feeder paddle 12 may be coupled to the bracket by a coupling bolt 19 and a spring 26, which may be a compression spring. As shown, the bolt 19 passes through bracket 14, then spring 26, and then through a hole or elongated slot in spring plate 21 of the feeder paddle 12. The bolt 19 fits through the slot in the spring plate 21, but the spring 26 does not, so the spring 26 will be held and positioned between the bracket 14 and the spring plate 21. The coupling bolt 19 is held in place by a locknut 17, which engages the threads of the bolt 19 that extend through the slot in feeder paddle spring plate 21.

Figure 7:
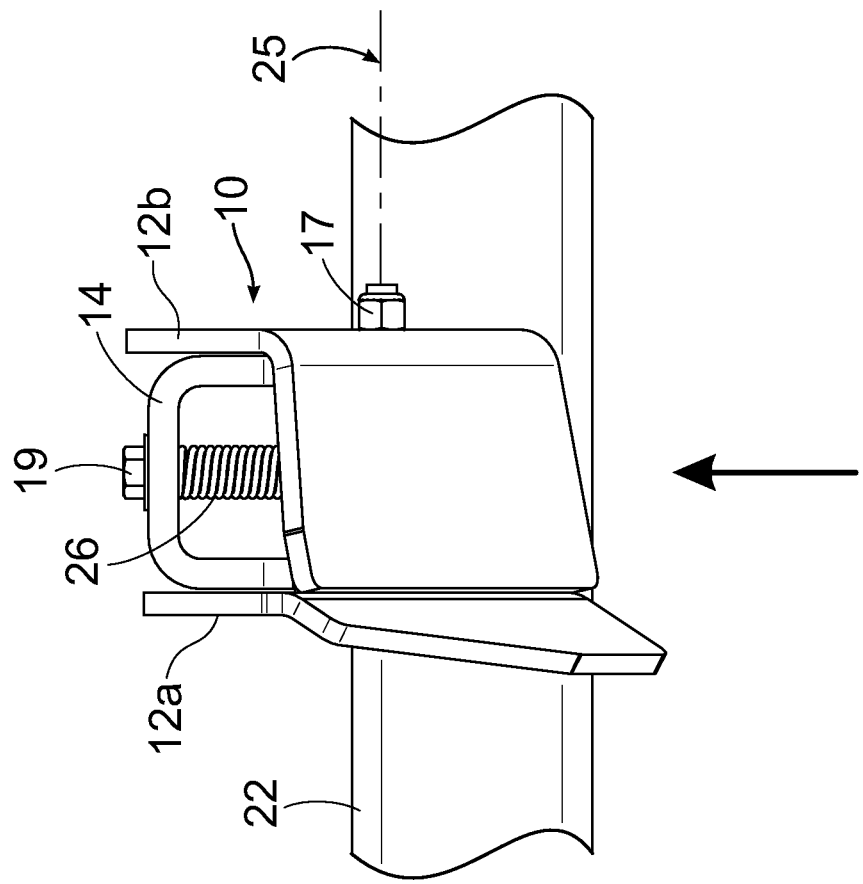
FIG. 7 is a top view of a feeder paddle assembly and a shaft of a spring-loaded feeding device in accordance with an example embodiment.

When coupled as shown and described, the feeder paddles 12 may pivot about pivot bolt 16, which defines a pivot axis 25 for each feeder paddle assembly 10. However, each feeder paddle will have a resting position, as shown in FIGS. 4 and 7, where it is held at its maximum distance away from each bracket 14. As also shown in FIG. 4, this maximum distance is dictated by the edges of the feeder paddle components, feeder paddle side plate 12a and inner feeder angle plate 12b engaging the shaft 22, which prevents further rotation of the feeder paddle. As mentioned briefly above, the feeder paddles 12 are urged toward the resting position by springs 26. The feeder paddle assemblies rotate as the shaft rotates, with each feeder paddle 12 ordinarily remaining in the resting position shown in FIG. 4.

Figure 8:
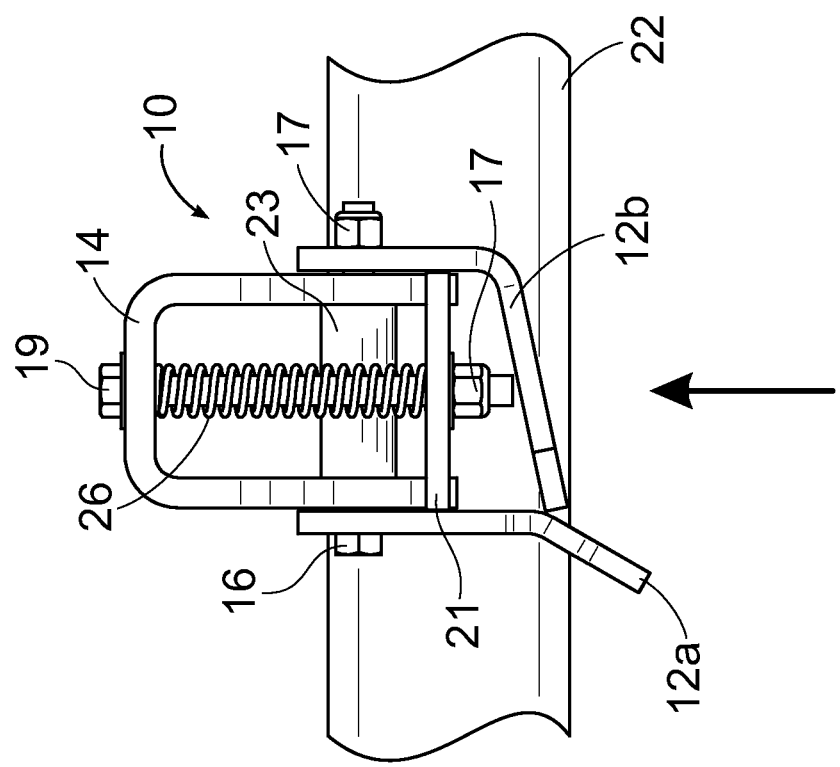
FIG. 8 is another top view of a feeder paddle assembly and a shaft of a spring-loaded feeding device in accordance with an example embodiment.

Each feeder paddle 12 can, however, pivot about its pivot axis 25 should the feeder paddle encounter an obstacle, such as a rock 35, which may be moved onto the pan 36 by the cutting action/forward movement of the ditcher 30. FIGS. 5 and 8 are simplified views which show a single paddle 12 in its deflected position, which compresses spring 26 between the paddle spring plate 21 and bracket 14, with the spring being held in position by coupling bolt 19, which passes through the opening in the spring.

FIGS. 1-3 and 14 illustrate the radial relationship of each feeder paddle assembly 10 to the others similarly mounted on shaft 22. For example, the left-most position shows two assemblies 10, mounted opposite each other at the same lengthwise position on the shaft, but 180° apart (i.e., on opposite sides of the shaft). For example, in FIG. 2, one feeder paddle assembly 10 is shown at the extreme left end of shaft 22 above the shaft, while another is shown directly below it, radially spaced apart from the first by 90°, below the shaft. As shown in FIG. 1, the next pair of feeder paddle assemblies 10, to the immediate right of the previously-described pair, have a similar radial relationship to each other, one being mounted above the shaft 22, and one below. As also shown, the second pair of assemblies is radially spaced apart from the first pair by 90. This pattern, as well as other radial spacing, can be repeated with multiple feeder paddle assemblies 10 spaced apart from each other along the shaft 22. It is not necessary that this radial spacing be limited to 180° for each pair of feeder paddles, or that the adjacent pair is spaced at 90° from the previous pair, as virtually any angular relationship is possible.

C. OPERATION OF PREFERRED EMBODIMENT

Figure 10:
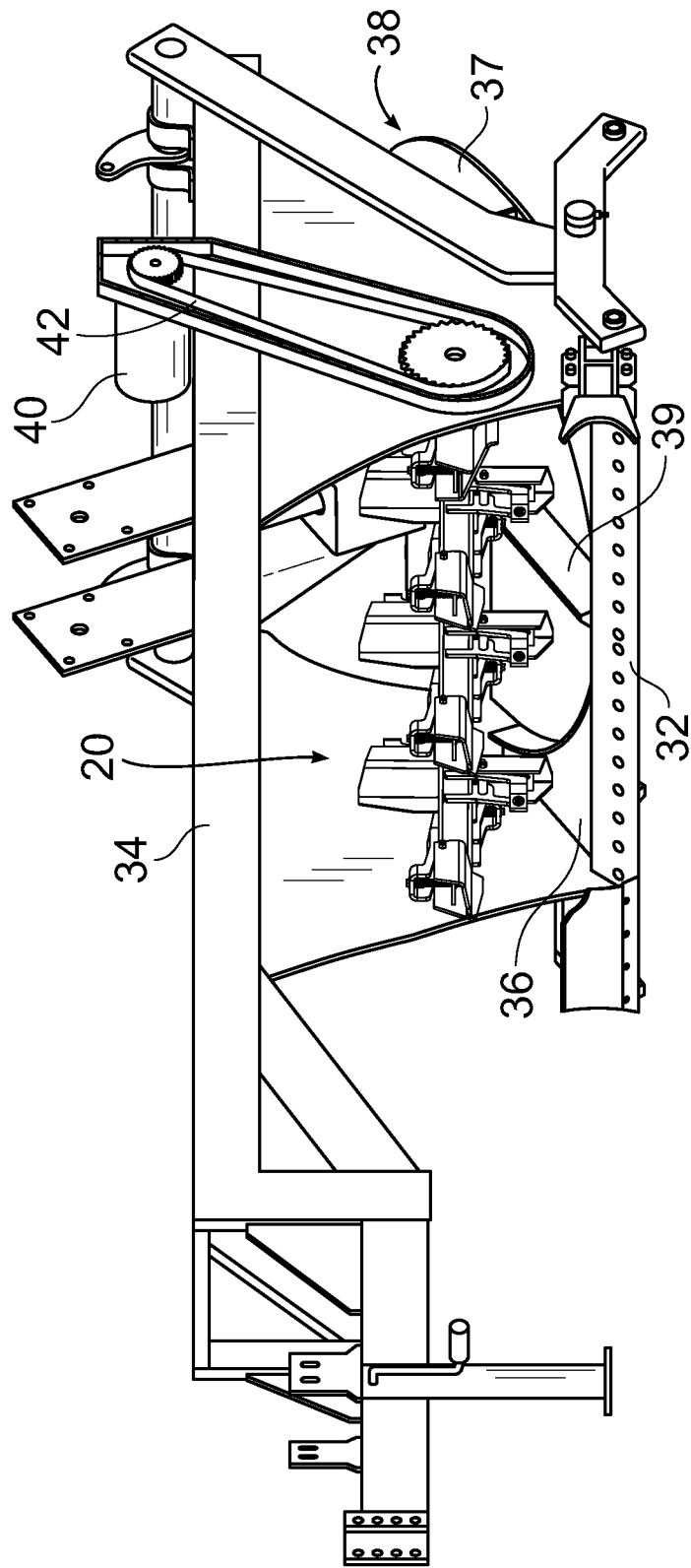
FIG. 10 is a perspective view of a spring-loaded feeding device in accordance with an example embodiment.
Figure 11:
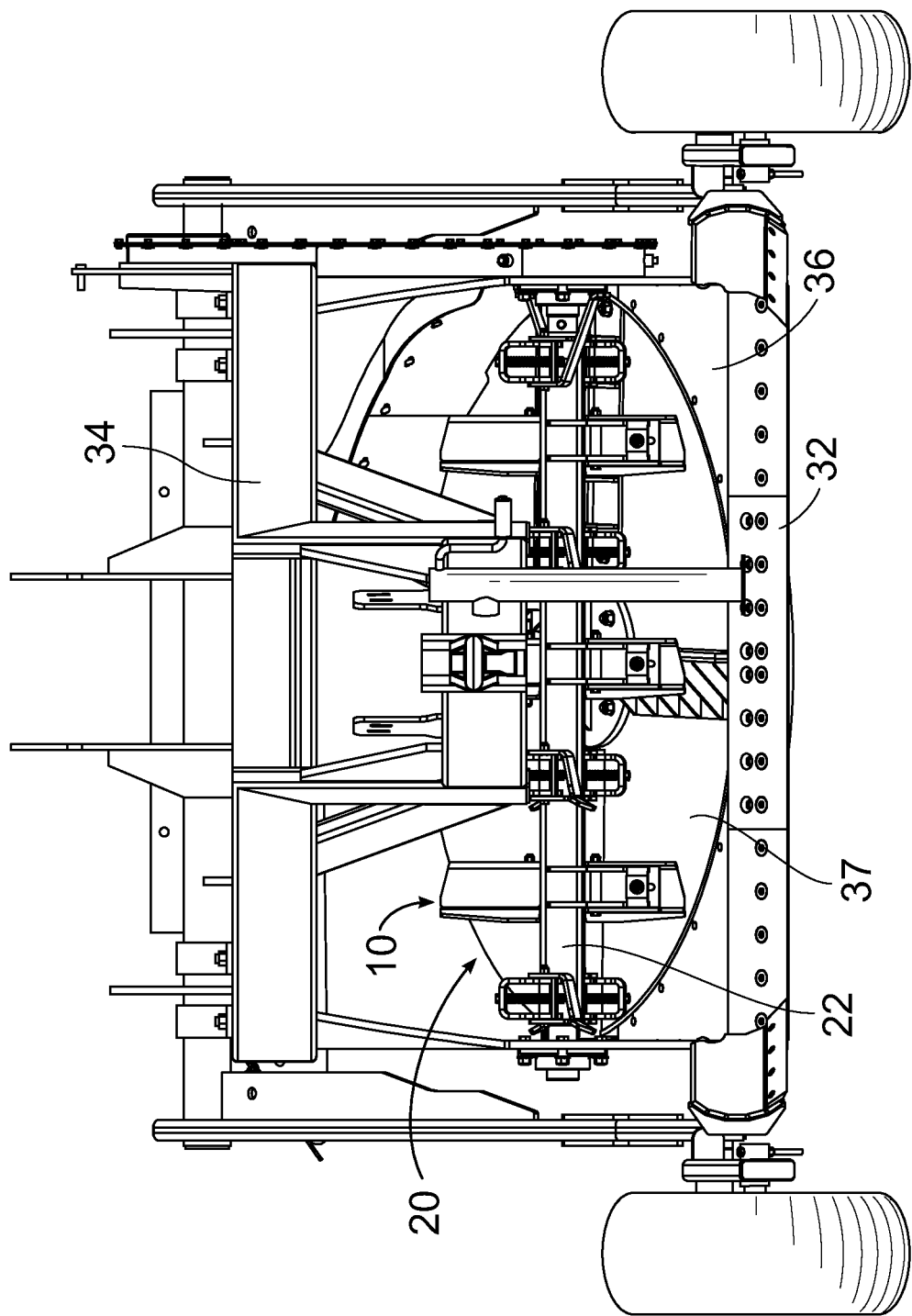
FIG. 11 is a front view of a spring-loaded feeding device in accordance with an example embodiment.
Figure 12:
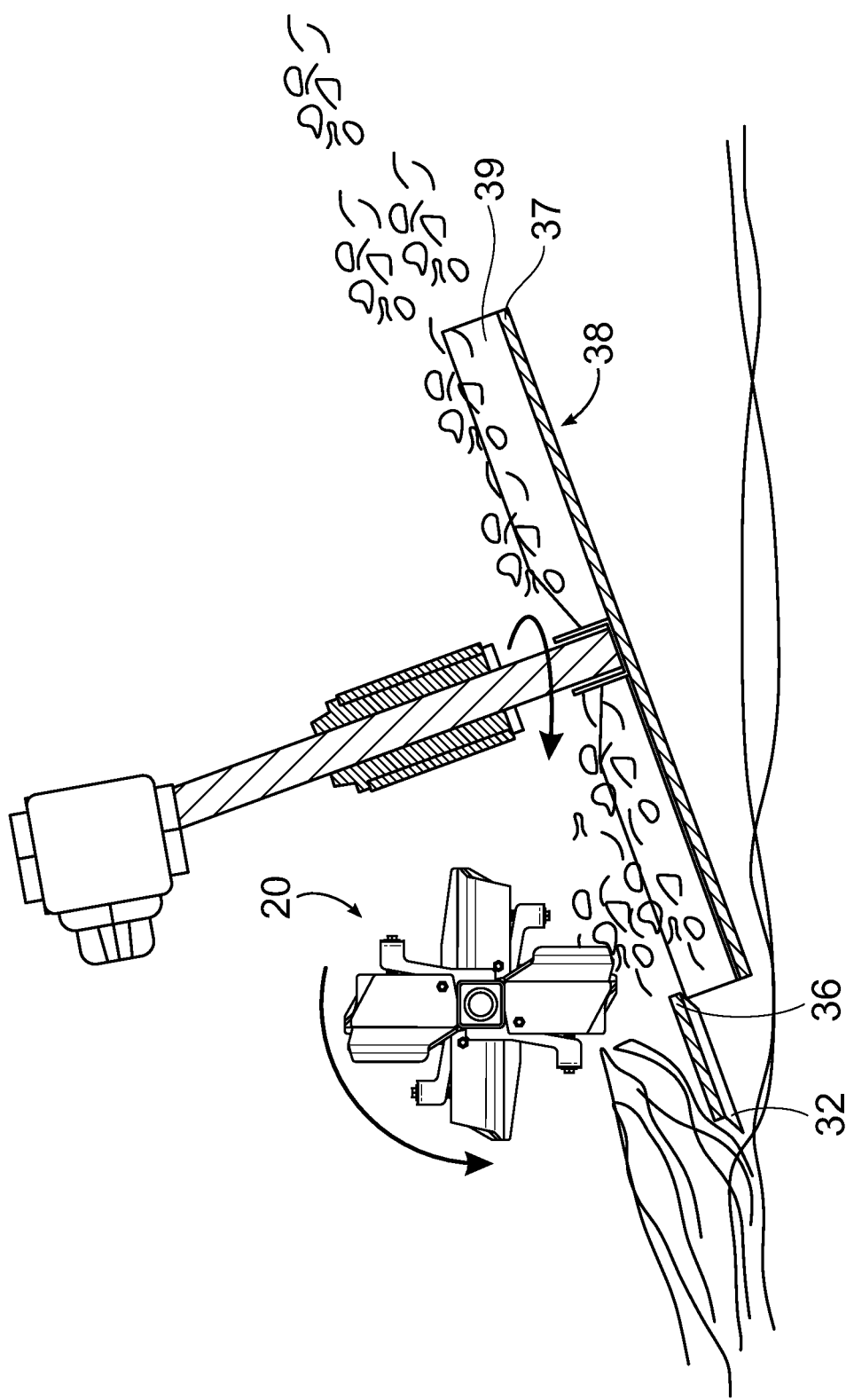
FIG. 12 is a partial side view of a spring-loaded feeding device in use in accordance with an example embodiment.

In use, a user typically pulls the flat-bottomed ditcher 30 behind a conventional tractor, towing the ditcher forward, so that the blade 32 engages and cleaves the soil at an adjustable depth, with the blade 32 penetrating the ground surface, as shown in FIGS. 10-12.

FIGS. 10-13 illustrate the overall relationship and mounting of the main components of the ditcher 30, with particular concentration on the spring-loaded feeding device 20 which is rotationally mounted on the frame 34 of the machine, and is driven by a motor 40 via chain 42. Also shown is the blade 32, pan 36, just behind the blade, as well as dispersing fan 38, comprised of a circular base 37 and a plurality of fan blades 39.

The newly-cut soil flows onto the pan 36 toward the dispersing fan 38, where the soil feeding device 20 engages the dirt, breaking it apart and throwing or propelling it downward and rearward onto the fan 38. The dirt falls onto the circular base 37 of the dispersing fan 38, whereupon the fan blades 39 engage the dirt. The fan blades 39 throw the dirt outwardly to the side and rearwardly where a deflector (not shown) deflects a portion of the thrown dirt in the desired direction. The user may pass over the newly created channel if they desire to dig a deeper channel. If the user desires to create a terrace, the user simply continues passing over the field throwing the dirt in the desired location.

When coupled to their brackets 14 as described above, the feeder paddles 12 may pivot about pivot bolt 16, which defines a pivot axis 25 for each feeder paddle assembly 10. Pivot bolt 16 fits within sleeve 23 which fits within bracket 14, allowing bolt 16 to pivot smoothly. When assembled, each feeder paddle 12 will have a resting position, as shown in FIG. 4, where it is held at its maximum distance away from each bracket 14, where it is forced by pressure from spring 26. As also shown in FIG. 4, this position is dictated by the edges of the feeder paddle components, feeder paddle side plate 12a and inner feeder angle plate 12b engaging the shaft 22, which prevents further rotation of the feeder paddles 12. The feeder paddles 12 are urged toward the resting position by springs 26. The entire spring-loaded feeder paddle assemblies 10 rotate as the shaft 22 rotates, with each feeder paddle 12 ordinarily remaining in the resting position shown in FIG. 4. This state is shown in operation in FIG. 12, for example. As shown, the feeding device 20 is driven, under power, counter-clockwise in the figure. If only soil (or mainly soil, with no large obstructions) is striking the device 20, each feeder paddle assembly 10 will normally not pivot about pivot axis 25, and will remain in its resting position due to springs 26.

But since each feeder paddle 12 may pivot about its pivot axis 25 against the pressure from spring 26, if the feeding device 20, or more specifically, one or more feeder paddles 12 encounter an obstacle, such as a rock 35, the paddles may pivot backward. This allows the device 20 to continue rotating without jamming upon encountering rocks or other obstructions, which can be a problem with feeding devices having rigid paddles. Large rocks, in particular, can create feeding and jamming problems because they may be moved onto the pan 36 by the cutting action/forward movement of the ditcher 30, as shown in FIG. 13. Without spring-loaded paddles, rocks may cause jamming if they become firmly lodged between the paddles 12 and any other part of the ditcher, such as the blade 32 or the pan 36. For clarity of illustration, FIGS. 4-5 show a single paddle assembly 10, with the feeder paddle 12 pivoted, compressing spring 26, which would occur upon encountering an obstacle.

Once rocks or other obstacles clear the ditcher, or move past the feeder paddles 12, the paddle or paddles 12 that encountered the obstacle will simply spring back to normal position, and the trenching operation can resume without requiring the user to, for example, manually remove any rocks from the feeding device, and without damage to the overall feeder mechanism, such as the spring-loaded feeding device 20 itself, the motor 40, or the drive chain 42.

Unless otherwise defined, all technical and scientific terms used herein have the same meaning as commonly understood by one of ordinary skill in the art to which this invention belongs. Although methods and materials similar to or equivalent to those described herein can be used in the practice or testing of the spring-loaded feeding device, suitable methods and materials are described above. All publications, patent applications, patents, and other references mentioned herein are incorporated by reference in their entirety to the extent allowed by applicable law and regulations. The spring-loaded feeding device may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed:

1. A soil feeding device, comprising:
    a shaft rotatably mountable on a frame and rotatable in a direction of rotation; and
    a plurality of feeder paddle assemblies, each feeder paddle assembly comprising:
        a) a bracket mounted on the shaft extending radially outward from the shaft, the bracket comprising a pivot axis proximate the shaft;
        b) a feeder paddle pivotally mounted on the bracket, the feeder paddle comprising a first end proximal to the shaft and a second end spaced apart from the first end, the feeder paddle extending radially outward from the shaft from the first end to the second end; and
        c) a torsion spring positioned to apply a force between the feeder paddle and the bracket;
    wherein the feeder paddle is pivotable in a direction opposite the direction of rotation against the force applied by the torsion spring.

2. The soil feeding device of claim 1, wherein at least two feeder paddle assemblies are spaced apart from each other along the shaft.

3. The soil feeding device of claim 2, wherein the plurality of feeder paddle assemblies comprises a first set of feeder paddle assemblies that each have a same radial orientation on the shaft.

4. The soil feeding device of claim 3, wherein the plurality of feeder paddle assemblies comprise a second set of feeder paddle assemblies that each have a same radial orientation on the shaft.

5. The soil feeding device of claim 4, wherein the first set of feeder paddle assemblies have a different radial orientation on the shaft than the second set of feeder paddle assemblies.

6. The soil feeding device of claim 5, wherein the first set of feeder paddle assemblies have a radial orientation on the shaft that is rotated about 90° from the second set of feeder paddle assemblies.

7. The soil feeding device of claim 1, wherein the plurality of feeder paddle assemblies comprises a first feeder paddle assembly and a second feeder paddle assembly mounted on the shaft at an orientation radially spaced about 180° from the first feeder paddle assembly.

8. The soil feeding device of claim 7, wherein the first feeder paddle assembly is mounted radially opposite the second feeder paddle assembly at a same location along a length of the shaft.

9. The soil feeding device of claim 8, further comprising a third feeder paddle assembly mounted on the shaft at a radial orientation radially spaced about 90° from the first feeder paddle assembly.

10. The soil feeding device of claim 9, wherein the third feeder paddle assembly is spaced apart from the first feeder paddle assembly along the shaft.

11. The soil feeding device of claim 9, further comprising a fourth feeder paddle assembly mounted on the shaft at an orientation radially spaced about 180° from the third feeder paddle assembly.

12. The soil feeding device of claim 11, wherein the fourth feeder paddle assembly is mounted radially opposite the third feeder paddle assembly at a same location along a length of the shaft.

13. The soil feeding device of claim 12, wherein the third feeder paddle assembly is spaced apart from the first feeder paddle assembly along the shaft.

14. The soil feeding device of claim 1, wherein each feeder paddle is mounted on the bracket with a pivot bolt that passes through the feeder paddle and the bracket proximate the pivot axis.

15. The soil feeding device of claim 14, wherein the pivot bolt passes through a spacer.

16. The soil feeding device of claim 15, wherein the torsion spring is held in position by the spacer.

17. A soil feeding device, comprising:
    a shaft rotatably mountable on a frame and rotatable in a direction of rotation; and
    a plurality of feeder paddle assemblies, each feeder paddle assembly comprising:
        a) a bracket mounted on the shaft extending radially outward from the shaft, the bracket comprising a pivot axis proximate the shaft;
        b) a feeder paddle pivotally mounted on the bracket, the feeder paddle comprising a first end proximal to the shaft and a second end spaced apart from the first end, the feeder paddle extending radially outward from the shaft from the first end to the second end; and
        c) means for applying a force between the feeder paddle and the bracket;
    wherein the feeder paddle is pivotable in a direction opposite the direction of rotation against the force applied by the means for applying a force.

18. The soil feeding device of claim 17, wherein the bracket comprises two substantially parallel sides extending radially away from the shaft.

19. The soil feeding device of claim 18, wherein the plurality of feeder paddle assemblies comprises a first set of feeder paddle assemblies that each have a same radial orientation on the shaft.

* * * * *